Patented Feb. 25, 1941

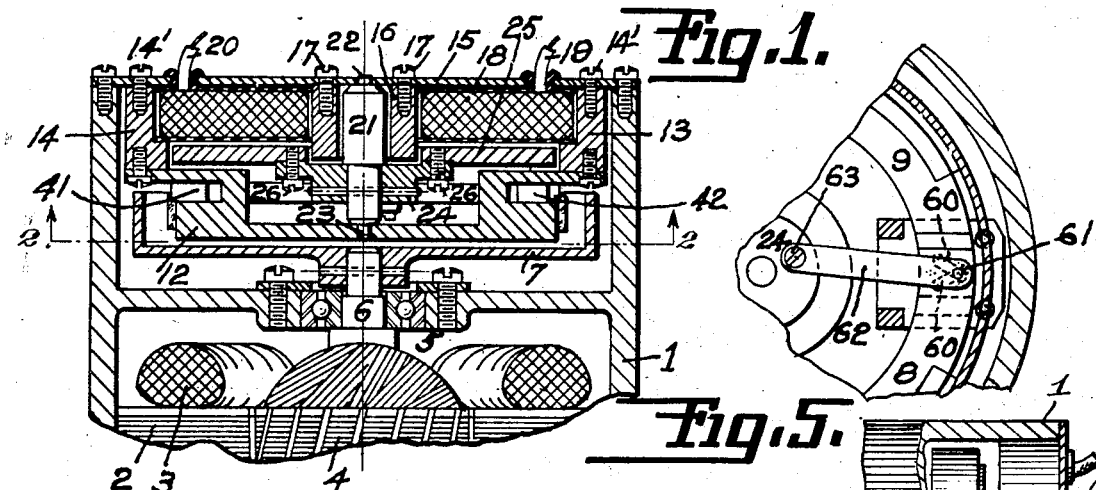
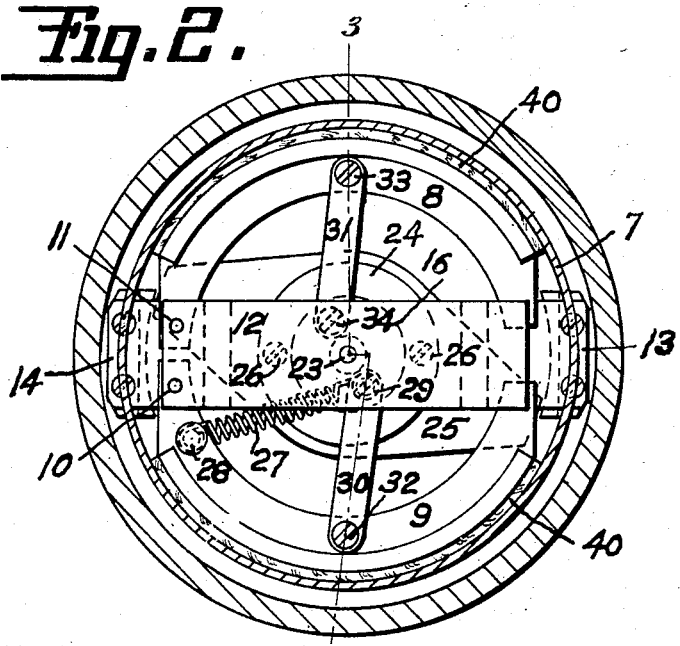
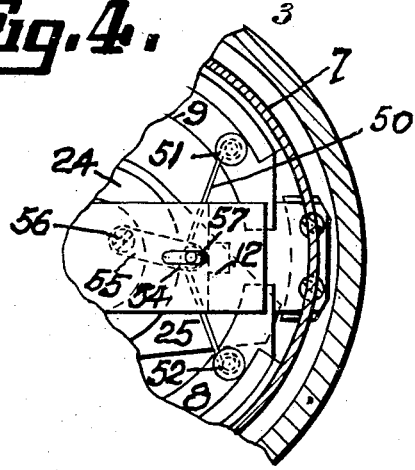

2,232,710

UNITED STATES PATENT OFFICE 2,232,710

QUIET BRAKE FOR MOTORS

Philip L. S. Lum, Chatham, N. J., assignor to Sperry Gyroscope Company, Inc., Brooklyn, N. Y., a corporation of New York Application November 15, 1938, Serial No. 240,472

7 Claims. (Cl. 188—172)

This invention relates to brakes as used on electric motors or other moving bodies employed in lifting weights as, for instance, hoists, cranes, elevators, etc. In all of these applications a brake is used in order to prevent a driven shaft, or the motor shaft itself, from continuing to turn under the influence of the load after the motor has been de-energized. Brakes of this type are also employed on reversible motors in order to hold the motor shaft fixed after the current supplied to the motor has been interrupted, if the position of the motor shaft is of particular importance with respect to some machine part moved by the motor to a predetermined position in which it is desirable to hold same.

More particularly, this invention relates to improvement in such brakes, especially with regard to the elimination of the noise generally caused by mechanical impact of metallic parts when the brake is engaged and disengaged. The usual practice as to brakes associated with electric motors is to employ an electromagnetic means of some sort to release the brake which is normally set or kept in braking condition by a spring. Evidently it is necessary that the electromagnetic means attracts an armature, the motion of the armature being employed to counteract the setting spring of the brake, and which ordinarily terminates its motion by striking hard against a stationary part of the electromagnetic means with resultant noise. Sound absorbing materials such as rubber, cork or the like have been employed with good success where the brake releasing magnets are operated by direct current. However, when employing alternating current for the operation of the brake releasing magnets, the use of such materials is not practical because their resilient nature will permit violent and often noisy vibration of the armature of the magnet due to the fact that the magnetic flux periodically becomes zero, at which time the spring will start to move the armature away, causing a vibration of substantially twice the frequency of the exciting current, and any resilient material accentuates such vibrations. The noise created by brakes of this type is produced by the direct metallic impact of the brake armature against the brake magnet or other metallic parts when engaged or disengaged, and by chattering and vibrating of the armature due to the fluctuation of the magnetic flux.

The present invention overcomes the aforementioned difficulties and eliminates the noises completely by preventing any metallic contact between the brake armature and the brake magnet or other stationary parts. According to this invention the armature is formed as a rotating member which is drawn into the path of the magnetic flux as soon as the magnet is excited and which, in so moving, describes an angular motion, which is counteracted by a spring arranged in such a way as to return the armature to its original position after the magnet becomes de-energized. At the same time, the spring applies the necessary pressure to the brake in order to set the same for locking the motor shaft.

The present invention incorporates the above mentioned advantageous features in a structure which is exceedingly compact and which may be housed in an extension of the motor housing if so desired.

Illustrative embodiments of this invention are shown in the accompanying drawing, in which:

Fig. 1 is a fragmentary vertical cross section through an electric motor provided with one form of brake means according to this invention.

Fig. 2 is a transverse sectional view, taken on line 2—2 in Fig. 1.

Fig. 3 is a fragmentary cross sectional view, taken in part on line 3—3 in Fig. 2.

Figs. 4 and 5 are fragmentary sectional views showing modifications of the novel brake means.

Fig. 6 is a view of the spring used in Fig. 4.

Fig. 7 is a view at right angles to and looking toward the left of Fig. 5.

Referring to the drawing, the housing 1 of an electric alternating current motor carries a stator 2, having a winding 3 and an armature 4, journaled in a ball bearing 5 by means of its shaft 6. The free end of this shaft carries a brake drum 7 which is engaged by the brake for locking the shaft 6. Two brake shoes 8 and 9 (Fig. 2) are shown as pivoted on pins 10 and 11 in a non-magnetic casting 12 forming a bridge between two pole pieces 13 and 14, made of magnetic material and fastened by screws 14' to a plate 15 also made of magnetic material. The bridge 12 is fashioned of non-magnetic material in order to prevent short circuiting of the magnetic flux. A core 16 is held to the center of the plate 15 by screws 17, and is surrounded by a coil winding 18, the ends 19 and 20 of which are electrically connected in series with at least one of the motor windings. A shaft 21, coaxial with the motor shaft 6, projects through an axial opening in the core 16, and has small trunnions 22 and 23 respectively journaled in the plate 15 and the bridge 12. Pinned to this shaft 21 is a hub 24 made of non-magnetic material to which the iron armature 25 is fastened by means of screws 26. As seen in Fig.

2, the armature is normally held in the position illustrated therein by means of a spring 27, one end of which is connected by a pin 28 to the brake shoe 9 and the other end of which is anchored to a screw 29 fastened to the hub 24. If the coil 18 is energized, the armature 25 will rotate until its free ends are completely covered by the pole pieces 13—14. This action takes place with considerable force and speed, but is entirely noiseless as a definite air gap is always maintained between the circular outer periphery of the armature 25 and the circular inner periphery of said pole pieces.

The armature 25 and the hub 24 are connected to the respective brake shoes by means of the links 30 and 31. Link 30 is pivotally engaged with brake shoe 9 by means of a pivot screw 32, while its other end is connected to the hub by means of the screw 29. The link 31 is pivotally connected to the brake shoe 8 by means of a pivot screw 33 and to the hub 24 by means of a pivot screw 34. The hub and the links together form a pair of toggle-like structures by means of which it is possible to exert considerable force or thrust upon the brake shoes 8 and 9 which is transmitted thereto by the tensional energy of the spring 27. It is a well known fact that the more nearly a toggle-like structure approaches a straight line the greater the force exerted by its free ends, while, at the same time, the linear motion of the ends becomes smaller and smaller and approaches zero. This feature has been utilized here to good advantage in order to obtain a maximum of force from a relatively small spring, so that only a comparatively small amount of energy is needed in the magnet to release the brake against the tension of the spring.

The brake shoes 8 and 9 on their outer circumference are recessed to receive a cork lining 40 which is suitably affixed to the brake shoes, and which forms the frictional surface for engagement with the brake drum 7. It will be understood, however, that any other suitable material such as asbestos, wood or rubber, or other brake lining material, may be used with equal success. The brake shoes are held against axial motion not only by the pins 10 and 11 but also by slots 41 and 42 in the bridge 12, in which the flat end portions of the brake shoes may slide. The cross sectional shape of the brake shoe 9 is shown in Fig. 3.

Another important feature of my novel brake means is that, due to its structure, the release of the brake drum is substantially instantaneous, i. e. as soon as the armature starts to move, while on the other hand, the braking action is greatly increased by the combination of spring force and inertia acting upon the toggle-like structure. Under the action of the spring, the armature 25 is accelerated considerably as soon as the coil 18 is de-energized, so that it follows the spring 27 at an increasing rate of speed. The total kinetic energy stored in the moving parts of the armature and hub is spent as an additional force upon the toggle-like structure, thereby vastly increasing the force with which the brake shoes are pressed against the brake drum, especially in the first moment, at which time the speed of the brake drum is highest and at which moment a strong braking force would be most desirable.

Fig. 4 shows a modified form of brake means of the general kind above described. All parts are substantially the same, with the exception of the brake spring 27 and the links 30 and 31. A peculiarly shaped spring 50, shown separately in Fig. 6, is used to interconnect the brake shoes 8 and 9. The outer loops of the spring are engaged around pins 51 and 52, and in its normal state, the spring will tend to straighten out and thereby press the brake shoes 8 and 9 outwardly against the brake drum 7. The inner loop 53 of the spring 50 surrounds a pin 54 fixed to a toggle link 55 which is pivoted on the hub 24 by means of a pin 56. The pin 54 slides in a slot 57 in the bridge 12. The lower part of the bridge 12 is shaped slightly different from what is shown in Fig. 1, in order to allow free play of the spring 50. The action of this brake is substantially the same as set forth with respect to the first described construction, with the exception that the spring 50 serves two purposes, namely, to apply the necessary power or thrust to the brake shoes 8 and 9, and returning the armature 25 to its original starting position, while also forming a second toggle-like connection which acts in series with the toggle link 55. In this case, the inertia of the armature 25 is applied to the center part of the spring 50 through the pin 54 by means of the toggle link connection 55, which tends to flatten out the spring thus increasing the natural tendency of the spring to straighten itself out. This modification has the advantage of fewer parts and greater simplicity.

Fig. 5 shows still another modified form of my invention. Here the brake shoes 8 and 9 have over-lapping sections at their ends so that the upper part of brake shoe 8 can slide over the lower part of brake shoe 9. Two inclined slots 60 are respectively formed in the over-lapping end portions of the brake shoes, and a pin 61, which is fixed to the lever 62 projects through the two slots in such a way as to thereby engage both brake shoes 8 and 9. The other end of the pin 61 slides radially in a slot similar to slot 57 (but not shown in Fig. 5, as therein the top part of the bridge 12 has been cut away). The lever or link 62 is connected to the hub 24 by means of a pivot screw 63, forming the hub 24 a toggle-like structure. In every other respect the parts employed and the functioning of the parts are substantially same as described for the previous modifications. The pin 61, when moved outward, will thrust the brake shoes 8 and 9 apart with considerable force, and the braking pressure is the greater the less inclination these slots 60 have. The action between the slots and the pin can be best described as a cam action. It also would be possible to make the slots curved to obtain special characteristics of braking action which might be desired to be attained in some cases.

Having now fully described my invention as to its principle and the means employed, it is understood that the drawing and description shall in no way limit the scope of my invention, but that many alterations and variations can be devised without departing from the principle described.

I claim:

1. In a brake for locking a shaft against rotation, means mounted on said shaft having a braking surface movably mounted brake means adapted to be moved into frictional engagement with said surface, toggle means for operating said brake means, electromagnetic means for operating said toggle means for releasing said brake including an armature rotatable about the axis of said shaft and spring means opposing said electromagnetic means for normally keeping said brake locked.

2. In a brake for locking a motor shaft against rotation and adapted for mounting within the housing of said motor, means mounted on said shaft having a braking surface, a pair of movably mounted brake shoes adapted to be moved into frictional engagement with said surface, spring actuated toggle means interconnecting said brake shoes and adapted to normally move said brake shoes with respect to each other and against said surface for setting the brake, and electromagnetically operated means including a rotating armature to reversely operate said toggle means against actuating spring tension to thereby release said brake shoes.

3. In a brake for locking a shaft against rotation, means mounted on said shaft having a braking surface, movably mounted brake means adapted to be moved into frictional engagement with said surface, toggle means for operating said brake means, a pivoted armature rotatable about the axis of said shaft and operatively connected to said toggle means, an electromagnet structure for supporting and rotating said armature into a position of maximum magnetic flux to release said brake, a coil winding for energizing said structure to move said armature, and spring means for rotating said armature in opposite direction to lock said brake.

4. In an internal brake for silently locking a shaft against rotation and for silently releasing same, means mounted on said shaft having a braking surface, a plurality of internal movable brake shoes adapted to be moved into frictional engagement with said surface, a pivoted armature rotatable about the axis of said shaft, a core, a pair of pole pieces to attract said armature and spaced to allow free and silent movement of said armature therebetween and around said core, whereby mechanical impact is prevented, a coil winding to magnetize said core, pole pieces and armature for causing limited angular motion of said armature, a plurality of toggle-like links connecting said armature to said brake shoes to cause release of said shaft when said coil is energized and spring means connected to rotate said armature to lock said shaft when said coil is deenergized.

5. In an internal brake for silently locking a shaft against rotation and for silently releasing same, means mounted on said shaft having a braking surface, a plurality of movable brake shoes adapted to be moved into frictional engagement with said surface, a centrally pivoted rotatable armature, a core, a pair of pole pieces to attract said armature and spaced to allow free and silent movement of said armature therebetween and around said core, whereby mechanical impact is prevented, a coil winding to magnetize said core, pole pieces and armature for causing limited angular motion of said armature, a toggle-like spring interconnecting said brake shoes to normally force same apart and against said braking surface, and a link eccentrically connected with said armature and to the midpoint of said spring, whereby said angular motion of said armature causes inward flexing of said spring and movement of said brake shoes to release said brake.

6. In an internal brake for silently locking a shaft against rotation and for silently releasing the same, means mounted on said shaft having a braking surface, a plurality of movable brake shoes adapted to be moved into frictional engagement with said surface, a centrally pivoted rotatable armature, a core, a pair of pole pieces to attract said armature and spaced to allow free and silent movement of said armature therebetween and around said core, whereby mechanical impact is prevented, a coil winding to magnetize said core, pole pieces and armature for causing limited angular motion of said armature, a spring to return said armature to lock said brake, a link having one end eccentrically connected to said armature and forming a toggle-like means therewith, a pin projecting near the other end of said link, and cam-like mutually inclined slots in said brake shoes engaged by said pin, whereby said angular motion of said armature causes relative motion of said brake shoes with respect to each other and to said surface to release said brake.

7. A silent internal brake comprising a cylindrical brake drum adapted for axial mounting on a shaft, a plurality of internal brake shoes pivotally mounted independently of said drum, spring means internal to said shoes for forcing the same outwardly into engagement with said drum, a magnetically permeable structure excitable by a coil coaxial with said drum, an armature rotatable about the axis of said coil in response to excitation of said magnetic structure, and a plurality of members eccentrically pivoted on said armature and operatively connected to said brake shoes for retracting the same from engagement with said drum against the action of said spring means.

PHILIP L. S. LUM.